United States Patent [19]

Overland

[11] Patent Number: 4,468,861
[45] Date of Patent: Sep. 4, 1984

[54] AXIAL THRUST BEARING THICKNESS MEASURING FIXTURE

[76] Inventor: Bert A. Overland, W. 2803 Lyond Ave., Spokane, Wash. 99208

[21] Appl. No.: 462,196

[22] Filed: Jan. 31, 1983

Related U.S. Application Data

[63] Continuation-in-part of Ser. No. 185,127, Sep. 8, 1980, abandoned.

[51] Int. Cl.³ .............................................. G01B 5/14
[52] U.S. Cl. ................................. 33/168 B; 33/143 R
[58] Field of Search ............. 33/143 R, 168 R, 168 B, 33/169 B, 147 R, 147 F, 174 R, 180 AT, 203, 181 AT; 269/48.4, 47, 243, 279

[56] References Cited

U.S. PATENT DOCUMENTS

| | | | |
|---|---|---|---|
| 1,498,638 | 6/1924 | Periolat | 269/47 |
| 1,996,169 | 4/1935 | Padgett | 33/180 AT |
| 1,997,639 | 4/1935 | Hetherington et al. | 33/180 AT |
| 2,117,854 | 5/1938 | Price | 33/181 AT |
| 2,155,562 | 4/1939 | Price | 33/181 AT |
| 2,255,996 | 9/1941 | Dodge et al. | 33/181 AT |
| 2,468,875 | 5/1949 | Henrikson | 33/174 R |
| 2,688,193 | 9/1954 | Holton | 33/181 AT |
| 3,191,259 | 6/1965 | Dalton | 33/174 R X |
| 3,217,417 | 11/1965 | Love et al. | 33/168 R X |
| 3,277,905 | 10/1966 | Thompson | 33/169 R X |
| 3,308,546 | 1/1965 | Storch | 33/203 X |
| 3,618,219 | 11/1971 | Kelly | 33/147 R X |
| 3,703,769 | 11/1972 | Pfeiffer | |
| 3,769,713 | 11/1973 | Norman | 33/143 R X |
| 3,854,216 | 12/1974 | Mosher | 33/181 AT |
| 3,859,729 | 1/1975 | Pfeiffer | 33/181 AT |
| 3,875,646 | 4/1975 | Pfeiffer | 33/181 AT |
| 4,054,999 | 10/1977 | Harbottle | 33/181 AT |

FOREIGN PATENT DOCUMENTS 815699 8/1951 Fed. Rep. of Germany .... 33/168 B

Primary Examiner—Willis Little
Attorney, Agent, or Firm—Wells, St. John & Roberts

[57] ABSTRACT

An axial thrust bearing thickness measuring fixture for accurately comparing the axial thicknesses of two thrust bearing assemblies. The fixture includes a rigid base and a rigid plate. A clamping mechanism releasably interconnects the base and plate. It is operable to clamp the plate and base against opposite radial thrust surfaces of a bearing assembly, which might include one or more shims. Separation between the base and plate then is a function of the effective axial bearing assembly thickness. An indicator may be mounted between the base and plate to record differences in the measured axial bearing thickness.

7 Claims, 7 Drawing Figures

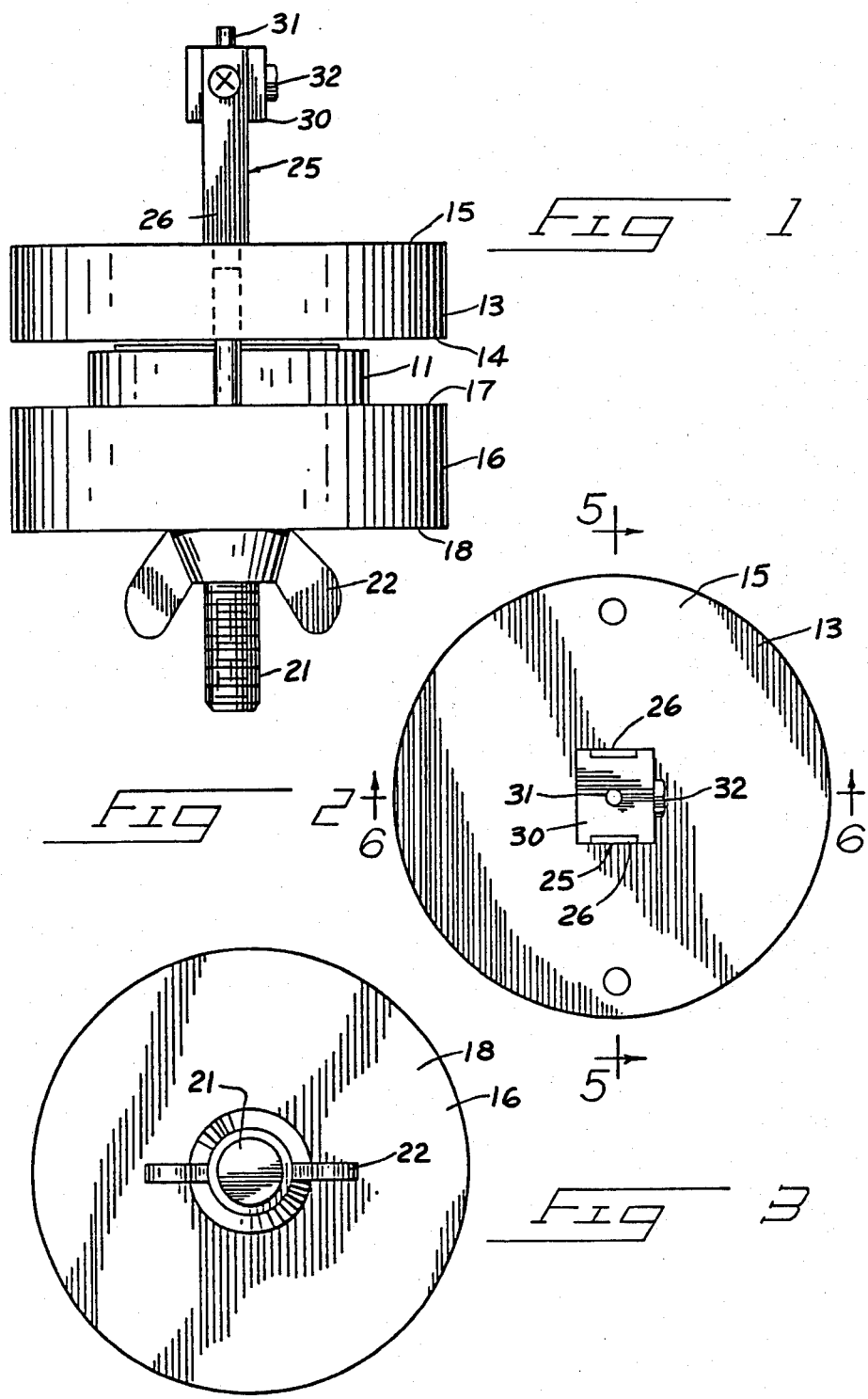

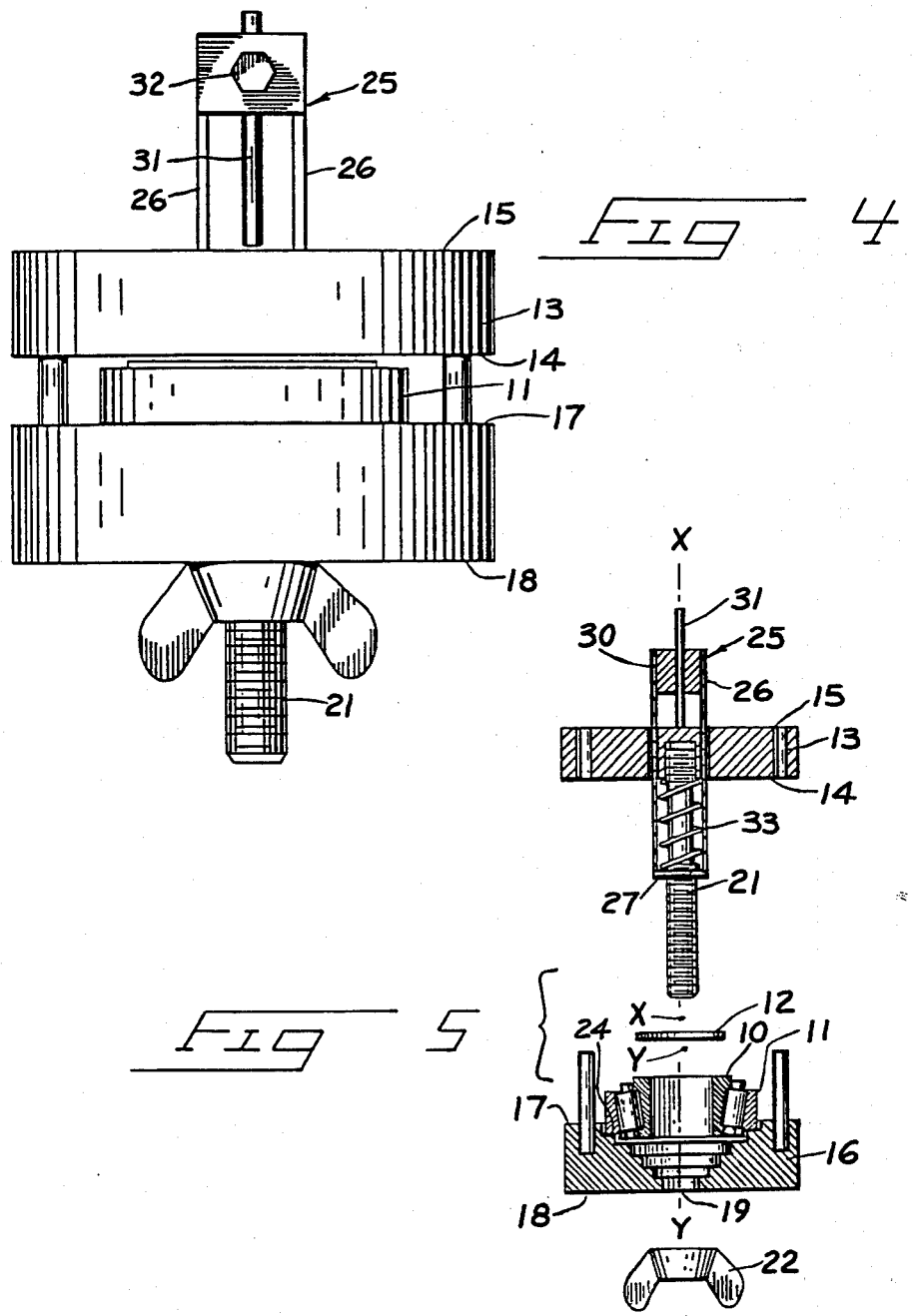

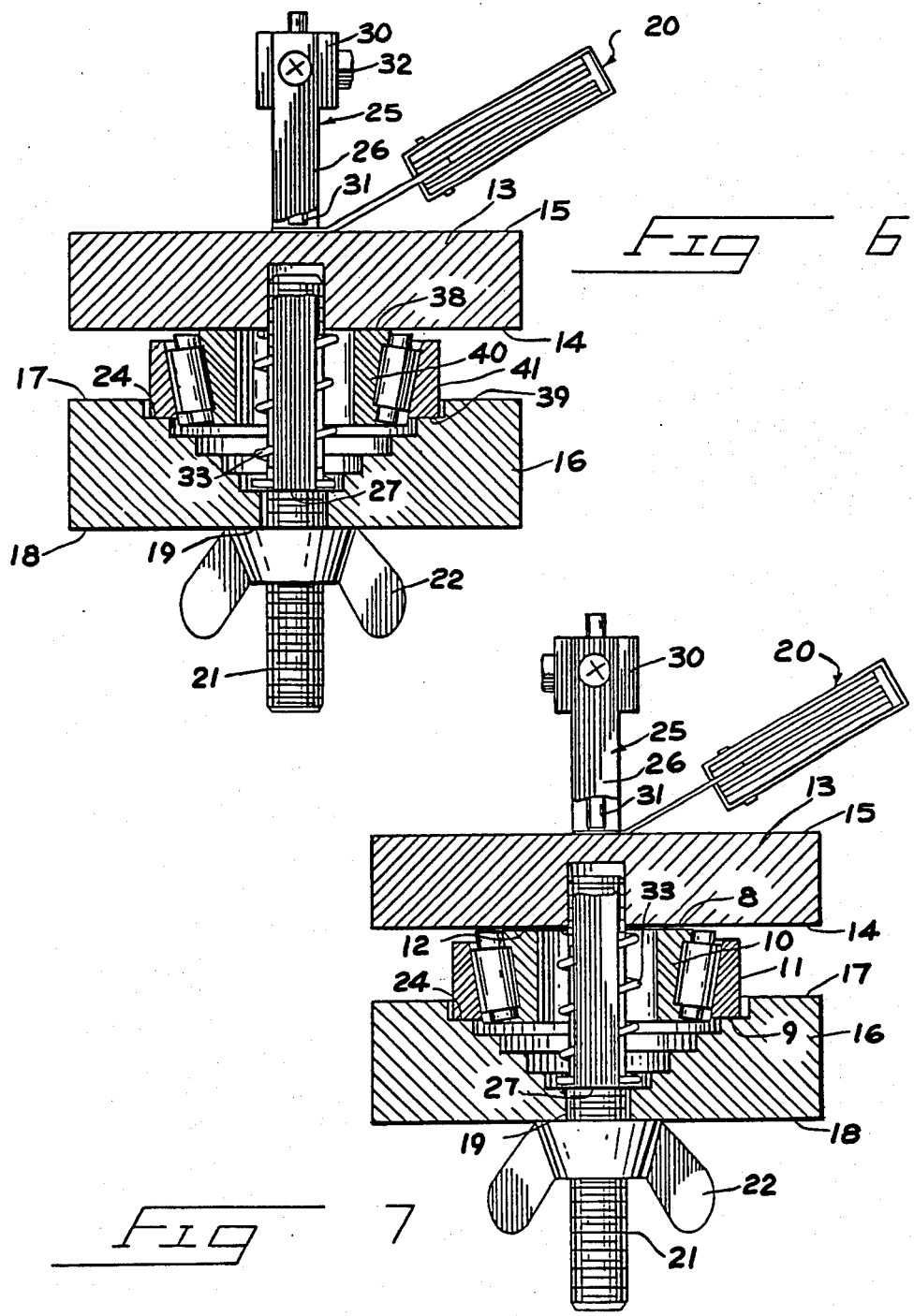

AXIAL THRUST BEARING THICKNESS MEASURING FIXTURE

RELATED APPLICATION

This is a continuation-in-part of pending U.S. application Ser. No. 185,127, filed on Sept. 8, 1980 now abandoned.

BACKGROUND OF THE INVENTION

This invention arose from an effort to eliminate the need for special purpose tools when reassembling an automobile differential after substituting new axial thrust bearing assemblies within it. This task typically requires special factory-supplied tooling, or tedious trial and error methods that require visual matching of gear tooth patterns. As in many other gear applications, it is most important that the meshing gears be reassembled in precisely the positions in which they have been previously used, or undesirable wear and noise will result during subsequent usage.

The present fixture enables the user to accurately compare the thickness of any axially shimmed bearing assembly to the thickness of a reference bearing assembly. It is designed specifically for use in conjunction with conical axial thrust bearings, which cannot be axially measured by hand, since the bearing elements are not self-aligning and must be compared in thickness under normal axial thrust loading conditions.

The fixture accommodates all the variables that occur in replacing shimmed axial thrust bearings, including minor differences in shim thickness, and mismatches between a bearing and a race. Mismatches are very frequent, since the bearings and races are typically distributed separately from one another. In many instances, each might be produced by a different manufacturer.

The present fixture provides a comparison of the axial thicknesses of two bearings with or without shims to enable a user to select the required replacement bearing and shim thickness. It enables the user to accurately select a new shim combination which will axially locate the bearing to match the previous position of the bearing in the assembled machinery. It eliminates trial and error and overcomes the usual difficulties encountered in pressing shims and/or bearings onto and from a mounting shaft. The comparison of the bearing assembly thickness can be accomplished independently of any shaft assembly, so that the final shimmed bearing assembly can be utilized with a high degree of confidence.

DESCRIPTION OF THE DRAWINGS

A preferred and alternate embodiment of this invention is illustrated in the accompanying drawings, in which:

FIG. 1 is a side elevation view of the fixture;
FIG. 2 is a top view;
FIG. 3 is a bottom view;
FIG. 4 is a front elevation view;
FIG. 5 is an exploded sectional view taken along line 5—5 in FIG. 2 showing loading of the fixture;
FIG. 6 is an enlarged sectional view showing usage of the fixture; and
FIG. 7 is a sectional view similar to FIG. 6, showing usage of the fixture.

PREFERRED EMBODIMENT OF THE INVENTION

In compliance with the constitutional purpose of the Patent Laws "to promote the progress of science and useful arts" (Article 1, Section 8), applicant submits the following disclosure of the invention.

The drawings illustrate one preferred form of the invention. It is designed to provide a visual comparison aid for accurately matching the thickness of an axially shimmed thrust bearing assembly, such as one including a conical roller bearing. An exemplary replacement bearing assembly is shown in FIGS. 5 and 7 of the drawings. It includes an inner conical bearing 10, a complementary outer race 11 and an annular shim 12. The critical thickness related to repositioning of the bearing assembly is the axial spacing between a first thrust surface on the outer annular shoulder 9 of the race 11, and a second thrust surface on the opposed shoulder or surface 8 exposed on the shim 12.

A typical original equipment bearing assembly, shown without shims, is illustrated in FIG. 6. It also includes an inner conical bearing 40 and a complementary outer race 41. The critical thickness which must be matched when replacing a worn bearing is the axial spacing between a first radial thrust surface on the outer annular shoulder 39 of the race 41 and a second radial thrust surface on the opposed shoulder 38 of bearing 40. After continued usage, this spacing will no longer be identical to original specifications because of wear in the bearing components.

As used herein the term "bearing assembly" shall refer to any combination of axial thrust bearing components having axially spaced annular thrust surfaces which engage critically spaced working machine elements. The bearing assembly might or might not include axial shims, which are conventionally used to extend the effective axial length of the bearing components.

It is understood that this disclosure relates to comparisons between the total effective axial thickness of bearing assemblies between opposed radial thrust surfaces which seat a working member. The thrust surfaces can be located either directly on the bearing and/or race, as well as on one or more shims positioned to either or both sides of the bearing components.

The fixture basically comprises a rigid base 13 and an opposed rigid plate 16. Means is provided for clamping the bearing assembly between base 13 and plate 16 so that the axial separation between them is indicative of bearing assembly thickness.

Base 13 is illustrated as being circular in shape and is formed about a base axis X—X (FIG. 5). It includes a first planar inner surface designated generally at 14 and an outer face 15. Similarly, plate 16 is illustrated as being circular in shape and is formed about a plate axis Y—Y (FIG. 5). It includes a second planar surface 17 and an outer face 18. The planar surface 14 is perpendicular to and centered about the base axis X—X for engaging one thrust surface of a bearing assembly. Surface 17 is perpendicular to and centered about the plate axis Y—Y for engaging a second thrust surface of the bearing assembly.

Base 13 includes a rigid post 21 threadably fixed to it. Post 21 is centered about base axis X—X. Post 21 protrudes outwardly beyond inner face 14 and has a length greater than the anticipated axial separation between base 13 and plate 16 when clamped about a bearing asssembly.

Plate 16 has an aperture 19 formed through it and centered along the plate axis Y—Y. Aperture 19 has a cross-sectional configuration complementary to that of post 21 and is adapted to freely receive post 21. In the case of a cylindrical post 21, as shown, aperture 19 is also cylindrical and has an inner diameter slightly greater than the outer diameter of the post 21.

A removable nut 22 threadably engages the outer end of post 21. It provides locking means adjustably engageable between the post 21 and the plate 16 when the base 13 and plate 16 are assembled at opposite sides of a bearing assembly with post 21 extending through both the bearing assembly and aperture 19 (See FIGS. 6, 7). Tightening of nut 22 selectively applies a preselected axial clamping force against the two thrust surfaces of a bearing assembly arranged coaxially between base 13 and plate 16 with its radial thrust surfaces engaged respectively by the first and second planar surfaces 14 and 17 and with post 21 extending through the central bearing aperture. In this completed clamping relationship, the first and second annular surfaces 14 and 17 of the base 13 and plate 16 are parallel and abut the opposed radial thrust surfaces on the working shoulders of the bearing assembly. The axial separation between the assembled base 13 and plate 16 therefore serves as a physical indicator of the effective bearing assembly thickness along the coaxial center axes of base 13 and plate 16.

One of the planar surfaces 14 or 17 is provided with an axially centered recess for clearing portions of a bearing assembly protruding axially outward beyond the thrust surface engaged by it. An example is shown by inner bearing 10, which protrudes beyond the thrust surface on shoulder 9 of the outer race 11 as illustrated in FIGS. 6 and 7. One or more such recesses can be provided.

As shown in the drawings, the recess is formed by a plurality of circular surfaces 24 axially centered on surface 17 of plate 16. Surfaces 24 are progressively stepped in depth, or recessed in a direction leading toward the center of plate 16. The stepped annular configuration allows the fixture to accommodate protruding bearing configurations and to be effectively used for measuring axial thickness of a wide variety of bearing assemblies having different diameters and axially protruding cages.

In order to make effective use of the fixture, reference means is provided on the assembled base 13 and plate 16 for selectively indicating their axial positions relative to one another. This is shown as a pedestal 25 that is slidably mounted to base 13 in a direction parallel to the center base axis.

Pedestal 25 includes one or more elongated legs 26 which are received through complementary apertures formed through base 13 adjacent to post 21 and which terminate at one end in inner end flanges 27 adapted to engage the inner face 17 of plate 16. The second ends of the legs 26 project beyond base 13 in a direction opposite to their inner ends and are fixed to a rigid transverse bracket 30 which joins them to complete an integral rigid pedestal unit. A compression spring 33 encircles post 21 and abuts both flanges 27 (FIG. 5). It urges the inner ends of legs 26 toward the plate 16 in the assembled fixture.

As one way of providing a visual indication of the relative axial position between base 13 and plate 16, which is a function of bearing thickness, there is provided an indicator post 31 movably located within an aperture formed through the bracket 30 across the outer end of pedestal 25. Post 31 is coaxial with the center base axis and post 21. It can be fixed in place by a manual locking screw 32.

The indicator post 31 serves as an indicating means on the plate 16, while the outer face 15 serves as a second indexing means on the base 13. The relative axial positions of these two indexing means can be visually checked by the relative axial position between the outer face 15 on base 13 and the adjustable post 31 on pedestal 25.

In practice, post 31 should initially be free to move axially during clamping of a worn bearing assembly between base 13 and plate 16 (FIG. 6). After nut 22 has been hand tightened, a feeler gauge 20 of predetermined thickness can be inserted between post 31 and the adjacent surface of the outer face 15. Locking screw 32 can then be tightened to accurately locate post 31 relative to base 13. The user can then recheck the spatial relationship between base 13 and plate 16 at any subsequent time by use of the same feeler gauge thickness. Therefore, once the base 13 and plate 16 have been axially positioned and the indicator provided on base 25 has been preset, the base 13 and plate 16 can be disassembled and reassembled any number of times with complete confidence that the original setting of the fixture will be properly maintained.

It is the ability to disassemble and reassemble the fixture in the preset axial separation that permits one to achieve accurate comparison between bearing assemblies prior to fitting a replacement bearing assembly in a machine. As shown in FIG. 7, the replacement components and one or more shims can replace the original worn bearing assembly to which the fixture is preset. By tightening nut 22, one can check the axial spacing along various combinations of bearing components until the exact spacing of the worn bearing assembly has been matched, as shown in FIG. 7. The use of the same feeler gauge 20 to check the axial positioning of the fixture components with respect to both bearing assemblies (FIGS. 6 and 7) assures exact duplication of the crucial shoulder separation in a replacement bearing. This in turn will assure that gears or other worn elements spaced by the replacement bearing assembly will be located in match their wear patterns. Mismatch of wear patterns in worn elements such as meshing gears would otherwise cause vibration, noise and accelerated wear in the reassembled machinery.

It is understood that other alternative indicator devices can be utilized in conjunction with this disclosure. The indication of bearing assembly thickness should be taken coaxially along the center of post 21, which will average out variations in bearing assembly thickness from one side to the other. This can be done with various types of micrometers, and with various measuring devices mounted to the base 13, plate 16 and pedestal 25. As an example, a conventional dial indicator (not shown) could be mounted to the pedestal 25 for direct reading of variations in axial spacing between base 13 and plate 16.

When using the fixture, one must first preset it to the effective axial thickness of the bearing assembly which is to be replaced. The used or worn bearing assembly, including any bearing shims, is clamped between base 13 and plate 16 as shown in FIG. 6. The nut 22 is hand tightened to secure the bearing assembly with its opsed annular shoulders parallel to one another. The indicator post 31 can then be accurately set and locked to the pedestal 25 for future reference.

Once the fixture has been set in this manner, one can verify and match the axial thickness of a replacement bearing assembly, including shim thickness as shown in FIGS. 5 and 7. The replacement bearing assembly and shims can be clamped in the same manner between base 13 and plate 16, until it has been verified that the axial thickness of the replacement is identical to the original. One can then confidently mount the bearing assembly and shims in place and reassemble the machinery within which they are incorporated. The axial positioning of the bearing will then be identical to the original positioning. This accurate repositioning can be achieved without the laborious task of pressing the shims or bearing on and off the equipment in which they are to be used.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An axial thrust bearing thickness measuring fixture for successively engaging individual annular bearing assemblies and for comparing their effective axial thicknesses to one another while the bearing assemblies are removed from their normal shaft placement, each bearing assembly having a central aperture formed about a bearing axis and two radial thrust surfaces axially spaced along the bearing axis; said fixture comprising:

a rigid base formed about a base axis;
   a first planar surface on said base perpendicular to the base axis for engaging one thrust surface of a bearing assembly;
   a rigid plate formed about a plate axis;
   a second planar surface on said plate perpendicular to the plate axis for engaging a second thrust surface of a bearing assembly;
   one of said planar surfaces being provided with an axially centered recess for clearing portions of a bearing assembly protruding axially outward beyond the thrust surface engaged by it;
   said base further comprising a rigid fixed post centered along the base axis and protruding outwardly beyond said first planar surface;
   said plate having an aperture formed therethrough having a cross-sectional configuration complementary to that of the post, said aperture being centered along the plate axis;
   locking means engageable between said post and said plate for selectively applying a preselected axial clamping force against the two thrust surfaces of a bearing assembly arranged coaxially between the base and plate with its thrust surfaces engaged respectively by said first and second planar surfaces and with said post extending through its central aperture, the axial spacing between the base and plate then being a function of the bearing assembly thickness; and
   reference means on said base and said plate, respectively, for indicating their relative axial positions with respect to one another when assembled with a bearing assembly between them.

2. An axial thrust bearing thickness measuring fixture for successively engaging individual annular bearing assemblies and for comparing their effective axial thicknesses to one another while the bearing assemblies are removed from their normal shaft placement, each bearing assembly having a central aperture formed about a bearing axis and two radial thrust surfaces axially spaced along the bearing axis; said fixture comprising:

a rigid base formed about a base axis;
   a first planar surface on said base perpendicular to the base axis for engaging one thrust surface of a bearing assembly;
   a rigid plate formed about a plate axis;
   a second planar surface on said plate perpendicular to the plate axis for engaging a second thrust surface of a bearing assembly;
   one of said planar surfaces being provided with an axially centered recess for clearing portions of a bearing assembly protruding axially outward beyond the thrust surface engaged by it;
   said base further comprising a rigid fixed post centered along the base axis and protruding outwardly beyond said first planar surface;
   said plate having an aperture formed therethrough having a cross-sectional configuration complementary to that of the post, said aperture being centered along the plate axis;
   locking means engageable between said post and said plate for selectively applying a preselected axial clamping force against the two thrust surfaces of a bearing assembly arranged coaxially between the base and plate with its thrust surfaces engaged respectively by said first and second planar surfaces and with said post extending through its central aperture, the axial spacing between the base and plate then being a function of the bearing assembly thickness; and
   reference means on said base and said plate, respectively, for indicating their relative axial positions with respect to one another when assembled with a bearing assembly between them;
   said reference means comprising a pedestal mounted to the base and including a leg freely slidable through an aperture formed through the base adjacent to said post and parallel to the base axis, said leg having one end abutting said plate.

3. An axial thrust bearing thickness measuring fixture for successively engaging individual annular bearing assemblies and for comparing their effective axial thicknesses to one another while the bearing assemblies are removed from their normal shaft placement, each bearing assembly having a central aperture formed about a bearing axis and two radial thrust surfaces axially spaced along the bearing axis; said fixture comprising:

a rigid base formed about a base axis;
   a first planar surface on said base perpendicular to the base axis for engaging one thrust surface of a bearing assembly;
   a rigid plate formed about a plate axis;
   a second planar surface on said plate perpendicular to the plate axis for engaging a second thrust surface of a bearing assembly;
   one of said planar surfaces being provided with an axially centered recess for clearing portions of a bearing assembly protruding axially outward beyond the thrust surface engaged by it;

said base further comprising a rigid fixed post centered along the base axis and protruding outwardly beyond said first planar surface;

said plate having an aperture formed therethrough having a cross-sectional configuration complementary to that of the post, said aperture being centered along the plate axis; and locking means engageable between said post and said plate for selectively applying a preselected axial clamping force against the two thrust surfaces of a bearing assembly arranged coaxially between the base and plate with its thrust surfaces engaged respectively by said first and second planar surfaces and with said post extending through its central aperture, the axial spacing between the base and plate then being a function of the bearing assembly thickness;

said axially centered recess comprising a plurality of annular circular surfaces axially centered on said one planar surface and progressively stepped in depth in a direction leading inward toward its center.

4. An axial thrust bearing thickness measuring fixture for successively engaging individual annular bearing assemblies and for comparing their effective axial thicknesses to one another while the bearing assemblies are removed from their normal shaft placement, each bearing assembly having a central aperture formed about a bearing axis and two radial thrust surfaces axially spaced along the bearing axis; said fixture comprising:

a rigid base formed about a base axis;

a first planar surface on said base perpendicular to the base axis for engaging one thrust surface of a bearing assembly;

a rigid plate formed about a plate axis;

a second planar surface on said plate perpendicular to the plate axis for engaging a second thrust surface of a bearing assembly;

said base further comprising a rigid fixed post centered along the base axis and protruding outward beyond said first planar surface;

said plate having an aperture formed therethrough having a cross-sectional configuration complementary to that of the post, said aperture being centered along the plate axis;

locking means engageable between said post and said plate for selectively applying a preselected axial clamping force against the two thrust surfaces of a bearing assembly arranged coaxially between the base and plate with its thrust surfaces engaged respectively by said first and second planar surfaces and with said post extending through its central aperture, the axial spacing between the base and plate then being a function of the bearing assembly thickness; and reference means on said base and said plate, respectively, for indicating their relative axial positions with respect to one another when assembled with a bearing assembly between them, said reference means comprising a pedestal mounted to the base and including a leg freely slidable through an aperture formed through the base adjacent to said post and parallel to the base axis, said leg having one end abutting said plate.

5. A fixture as claimed in claim 4 wherein the pedestal leg has a second end projecting beyond said base in a direction opposite to its first end.

6. A fixture as claimed in claim 4 wherein the pedestal leg has a second end projecting beyond said base in a direction opposite to its first end; and indicator means mounted to the second end of said pedestal leg for indicating relative axial positions of the base and plate with respect to one another.

7. A fixture as claimed in claim 4 further comprising:

spring means operably engaged between the pedestal and base for urging said one end of the pedestal leg toward said plate.

* * * * *